T. L. McMINN.
STALK CUTTER.
APPLICATION FILED JULY 30, 1912.

1,052,839.

Patented Feb. 11, 1913.
2 SHEETS—SHEET 1.

Thomas L. McMinn,
Inventor

Witnesses by C. A. Snow & Co.
Attorneys

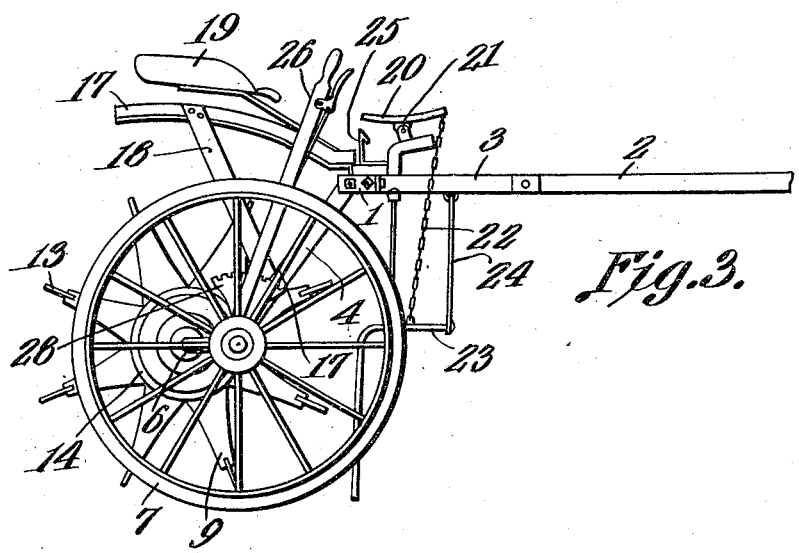
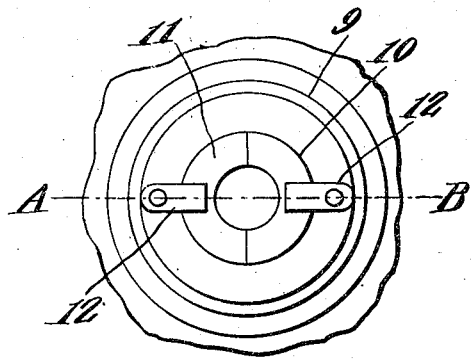
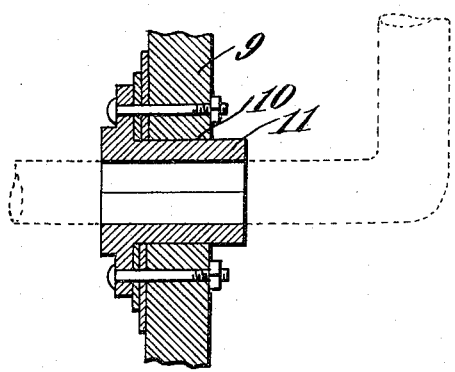

UNITED STATES PATENT OFFICE.

THOMAS L. McMINN, OF GUNTERSVILLE, ALABAMA.

STALK-CUTTER.

1,052,839.

Specification of Letters Patent.   Patented Feb. 11, 1913.

Application filed July 30, 1912.   Serial No. 712,319.

*To all whom it may concern:*

Be it known that I, THOMAS L. MCMINN, citizen of the United States, residing at Guntersville, in the county of Marshall and State of Alabama, have invented certain new and useful Improvements in Stalk-Cutters, of which the following is a specification.

This invention relates to machines for cutting stalks, its object being to provide a machine of this character utilizing a revolving series of cutting blades and having additional means whereby the blades are caused to reciprocate while rotating and thus have a shearing action so as to cut the stalks whether they be wet or dry.

Another object is to provide improved means whereby the blades can be easily raised or lowered by the driver.

Another object is to provide improved means for shifting the stalks into the path of the cutting blades.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

Figure 1:
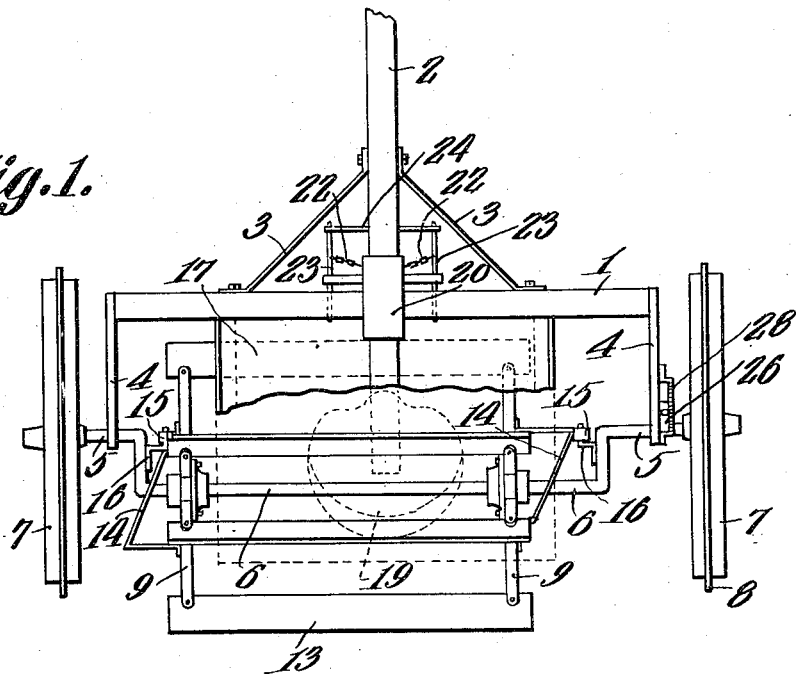
Figure 2:
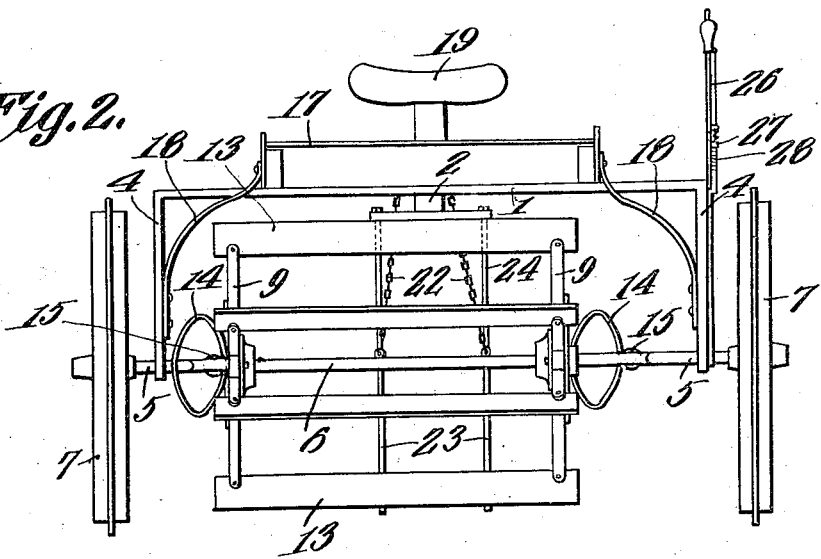

In said drawings:—Figure 1 is a plan view of the machine, the guard plate being broken away. Fig. 2 is a rear elevation. Fig. 3 is a side elevation. Fig. 4 is an enlarged side elevation of one of the hubs of the cutting wheel. Fig. 5 is a section on line A—B Fig. 4.

Referring to the figures by characters of reference 1 designates the main frame of the machine, the same having a tongue 2 extending forwardly therefrom and provided with suitable braces 3. The sides of the frame are inclined downwardly and rearwardly, as shown at 4, and are loosely engaged by the terminal portions of spindles 5 of an arched axle 6, there being supporting wheels 7 mounted beyond the sides of the frame 4 and engaging the spindles 5, each of these wheels being preferably formed with an annular flange 8 for engaging the ground so as to prevent the machine from shifting laterally.

Mounted on the intermediate portion of the arched axle and between the spindles 5 are star wheels 9 each of which has a central opening 10 sufficiently large to permit the wheel to be slipped around the elbows of the arched axle and into position upon the intermediate portion of the axle. Seated within these openings 10 are split hubs 11 having oppositely extending ears 12 which are bolted or otherwise secured to the star wheels and these hubs are adapted to rotate freely on the axle. The arms of the star wheels are connected by radially disposed cutting blades 13 having straight cutting edges. Any desired number of these blades may be used.

Secured to the outer face of each star wheel is a cam ring 14, the two rings being oppositely disposed and being adapted to engage anti-friction rollers 15 carried by brackets 16 which are secured to the axle 6 and close to the spindles 5. As these cam rings 14 are oppositely disposed, it will be apparent that, as the cutting blades and star wheels rotate upon the axle 6, the cam rings, by engaging the rollers 15, will cause the cutting blades 13 to reciprocate transversely of the machine. By using cam rings such as shown in the drawings, the cutting blades will move once to the right and once to the left during each complete rotation of the star wheels about the axle. It is to be understood, however, that by varying the shape of the cam rings, one or more additional reciprocations of the knives or cutting blades can be produced during each rotation of the star wheels.

An arcuate guard plate 17 is mounted on and extends rearwardly from the frame 3 and may be held, at its rear end, by braces 18. The seat 19 of the driver is supported above the guard plate 17. A foot lever 20 is pivotally mounted, as at 21, in front of the seat 19 and is connected, as by means of one or more chains 22, to drag rods 23 which are pivotally connected to hangers 24 and extend downwardly so as to engage the ground. A spring catch 25 is arranged adjacent the foot lever 20 and, by pressing this lever downwardly into engagement with the catch, the drag rods 23 will be elevated out of contact with the ground and held in such position. When, however, the foot lever 20 is released, the drag rods will gravitate into engagement with the ground.

An adjusting lever 26 is fixedly connected to one of the spindles 5 of the axle and is provided with a spring pressed dog 27 adapted to engage a toothed segment 28 and thus hold the lever and axle in any position to which they may be shifted.

In using the machine the drag rods 23 are lowered and will, when moving along the ground, pull the stalks into the path of the cutting blades 13. These blades, as they rotate, will cut into the stalks and slide transversely of the machine so as to produce a shearing action and insure severing the stalks whether they be wet or dry. When it is desired to lift the blades out of contact with the stalks, lever 26 is shifted so as to rotate the arched axle and swing its intermediate portion upwardly. By pushing downwardly on the foot lever 20, the drag rods 23 can be elevated out of contact with the ground, as hereinbefore described.

It is to be understood that, if desired, the hangers 24 may be eliminated and the drag rods 23 can be pivotally connected directly to the tongue 2. Furthermore, if desired, a guard plate may be placed over the rollers 15 so as to prevent trash and the like from falling thereonto and causing them to wear quickly. It is not thought that illustration of this plate is necessary.

What is claimed is:—

1. A stalk cutter including a wheel supported structure having an arched axle, a revoluble series of cutting blades supported by the axle, means for reciprocating the blades transversely of the structure during the rotation of the blades, and means for rotating the axle to adjust the blades vertically.

2. A stalk cutter including a wheel supported structure having an axle, a revoluble series of cutting blades mounted on the axle, coöperating means upon the blades and axle and revoluble with the blades for reciprocating all of the blades in unison transversely of the structure during the rotation of the blades.

3. A stalk cutter including a wheel supported structure having an arched axle, a revoluble series of cutting blades mounted on the axle, coöperating means upon the blades and axle and revoluble with the blades for reciprocating the blades transversely of the structure during the rotation of the blades, and means for rotating the axle to adjust the blades vertically.

4. A stalk cutter including a wheel supported structure having an arched axle, wheels mounted for rotation on the axle, cutting blades connecting the wheels, coöperating means upon the wheels and arched axle for reciprocating the blades transversely of the structure during their rotation upon the axle, and means for rotating the axle to adjust the blades vertically.

5. A stalk cutter including a wheel supported structure having an arched axle, wheels mounted for rotation on the axle, cutting blades connecting the wheels, cams revoluble with the wheels, means on the axle and coöperating with the cams for reciprocating the blades transversely of the structure during the rotation of the wheels on the axle, and means for rotating the axle to elevate the blades.

In testimony whereof I affix my signature in presence of two witnesses.

THOS. L. McMINN.

Witnesses:
 W. SIEBOLD,
 JIM DANGETTE.

---

Copies of this patent may be obtained for five cents each, by addressing the "Commissioner of Patents, Washington, D. C."